United States Patent [19]

Allemano

[11] Patent Number: 4,520,668
[45] Date of Patent: Jun. 4, 1985

[54] MANOMETRIC INSTRUMENT FOR UNDERWATER DIVING

[76] Inventor: Emilio Allemano, Via Rosolino Pilo, 4, 10143 Torino, Italy

[21] Appl. No.: 469,336

[22] Filed: Feb. 24, 1983

[30] Foreign Application Priority Data

Jul. 5, 1982 [IT] Italy .................. 67852 A/82

[51] Int. Cl.³ .................. G01F 23/18; G01L 7/08
[52] U.S. Cl. .................. 73/300; 73/432 R; 73/732; 235/83
[58] Field of Search .............. 73/300, 431, 432 D; 116/292, 296, 334, 291, 271; 235/83, 84, 66

[56] References Cited

U.S. PATENT DOCUMENTS

| | | | |
|---|---|---|---|
| 987,746 | 3/1911 | Reynolds | 116/334 X |
| 2,174,608 | 10/1939 | Vail | 116/292 |
| 2,506,885 | 5/1950 | Noxon | 116/292 |
| 3,111,003 | 11/1963 | Droz | 73/432 R X |
| 3,206,115 | 9/1965 | Norman | 235/84 X |
| 3,434,658 | 3/1969 | Goldstein | 235/84 X |
| 3,475,902 | 11/1969 | Wessel | 73/432 R X |
| 3,505,808 | 4/1970 | Eschle | 73/432 R |
| 3,605,498 | 9/1971 | Lamb | 73/431 X |
| 3,992,948 | 11/1976 | D'Antonio et al. | 73/432 D |
| 4,050,314 | 9/1977 | Longhetto | 73/300 X |

*Primary Examiner*—Daniel M. Yasich
*Attorney, Agent, or Firm*—David A. Jackson; Daniel H. Bobis

[57] ABSTRACT

A manometric instrument for use with air bottles of an underwater respirator for underwater diving, comprises a sealed casing having a transparent closure cover; a first fixed scale fixed within the casing for indicating pressure and having graduations based on a first unit of measurement; a second fixed scale fixed within the casing adjacent the first fixed scale for indicating pressure and having graduations based on a second unit of measurement; either the first or second units of measurement expressing units of length, and the other expressing residual pressure of air in the air bottles; an adjustable fixed scales; a first movable scale fixed on the support element and having graduations based on the second units of measurement and differing from the second fixed scale; a second movable scale fixed on the support element for indicating an ascent time as a function of either the depth under water and the residual pressure, when the support element is adjustably displaced such that a value on the first movable scale is brought into coincidence with the same value on the second fixed scale; an indicator element movable along the first fixed scale and the second movable scale; and a transducer device for detecting pressure and for controlling the position of the indicator element in dependence on the detected pressure so as to indicate the ascent time on the second movable scale.

7 Claims, 3 Drawing Figures

MANOMETRIC INSTRUMENT FOR UNDERWATER DIVING

BACKGROUND OF THE INVENTION

The present invention relates to a manometric instrument for underwater diving using a respirator.

In general, during such above mentioned dives, two different manometric instruments are consulted, of which the first is connected to the bottles of the respirator and provides, moment by moment, the pressure of the residual air within the bottles, whilst the second provides instant by instant the ambient external pressure expressed in meters of depth.

The whole of the data provided by the two above mentioned instruments has an absolute value only when the utiliser is at a depth from which he can ascend without requiring to include any decompression stops in his ascent, whilst it has a relative value in all other cases. In fact, if decompression stops have to be made the user must transform the "pressure" information with which he is provided by the instrument connected to the air bottles into "time" information in order to know if, on the basis of the other information provided by the other manometric instrument (actual depth and maximum depth reached) and by a chronometer (total immersion time), the air at that moment present within the interior of the air bottle is sufficient to allow him to ascend from the depth at which he is located.

The above described transformation requires not only the execution of relatively complicated calculation, but must be performed by the user in an absolutely accurate manner given that any errors whatsoever can involve often fatal consequences.

SUMMARY OF THE INVENTION

The object of the present invention is that of providing a manometric instrument which eliminates the above described disadvantages by providing the user automatically not only with "pressure" information, but also "time" information.

The said object is achieved by the present invention in that it relates to a manometric instrument for underwater diving, comprising a sealed casing provided with a transparent closure cover, a transducer device operable to control, as a function of an external pressure detected thereby, the position of an indicator element which is movable along a first, or external pressure scale, disposed in a fixed position with respect to the said casing, said first scale being graduated on the basis of a first unit measurement; characterised by the fact that it includes a second fixed pressure scale graduated on the basis of a second unit of measurement different from the said first unit of measurement, the said second scale being disposed adjacent the first; and a support element mounted in a position which is adjustable along the fixed scale and supporting a first movable scale different from the said second fixed scale, but graduated on the basis of a unit of measurement of the same type, and a second movable scale over which the said indicator element moves expressing time; one of the said units of measurement expressing, in units of length, the depth and the other expressing in units of pressure, the residual air pressure within the interior of the bottles of an underwater respirator used for the dive, and the said second movable scale expressing an ascent time as a function of the depth and of the said residual pressure when two values corresponding to those of these two latter magnitudes which are indicated on the said second fixed scale and first movable scale are brought into coincidence with one another by displacing the said adjustable support.

BRIEF DESCRIPTION OF THE DRAWINGS

Further characteristics and advantages will become apparent from the following description with reference to the attached drawings, which illustrate various non-limitative embodiments thereof, in which.

DETAILED DESCRIPTION OF THE INVENTION

Figure 1:
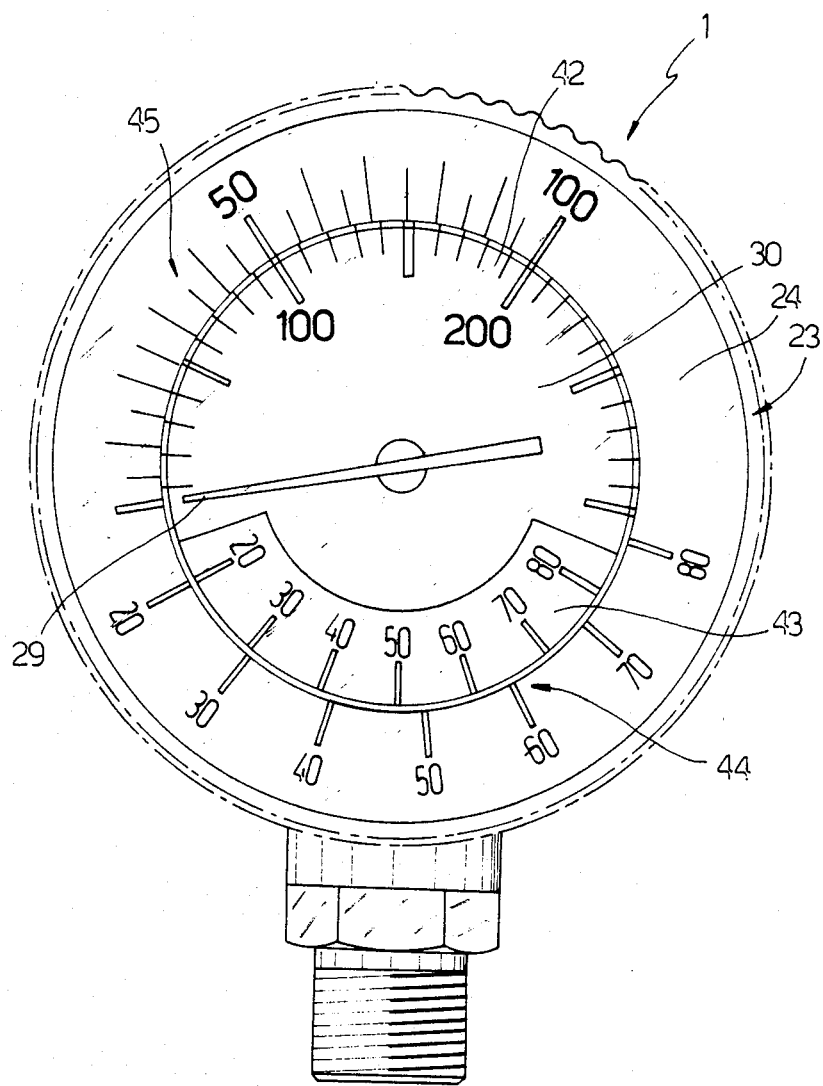
FIG. 1 is a front face view of a first embodiment of a manometric instrument according to the present invention.
Figure 2:
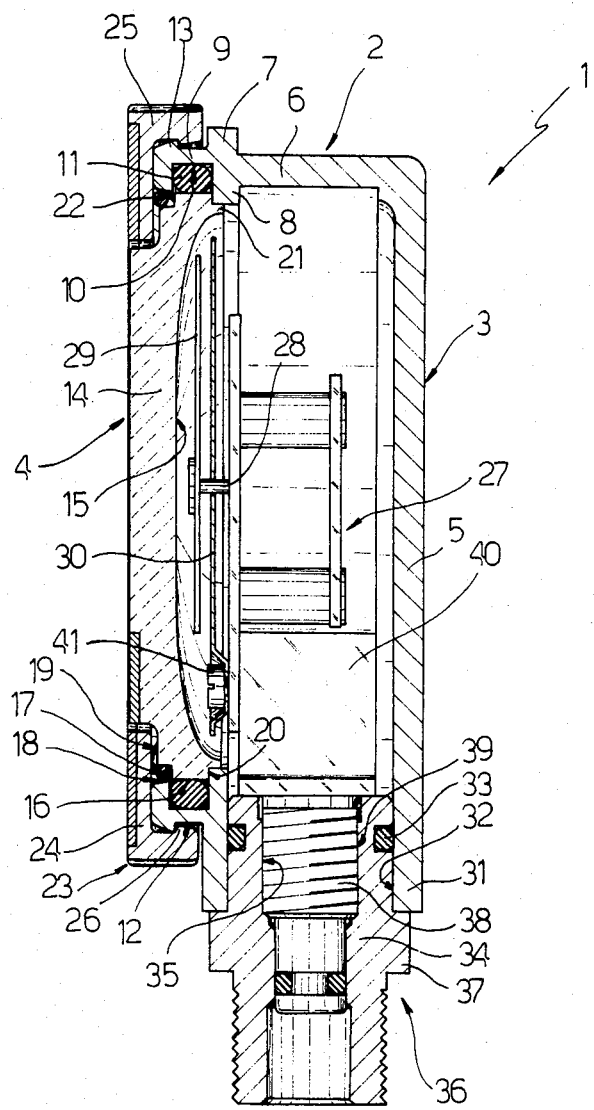
FIG. 2 illustrates in axial section the instrument of FIG. 1.

FIGS. 1 and 2 illustrate an underwater manometer 1 particularly adapted to be connected to the air bottles (not illustrated) of an underwater respirator either directly or by means of a separate coupling (not illustrated) for continuously providing the value of the pressure of air remaining within the interior of the air bottles themselves.

As illustrated in particular in FIG. 2, the manometer 1 includes a sealed casing 2 of substantially cylindrical form comprising a cup shape body 3 preferably made of metal material, closed with a fluid tight seal by a transparent cover 4 preferably made of plastics material.

The cup shape body 3 includes a flat bottom wall 5 and a substantially cylindrical side wall 6 having, along its free edge, an outer annular flange 7 and an inner annular flange 8 which are substantially coplanar with one another. From the free annular surface of the flanges 7 and 8, an annular body 9 extends outwardly, this body being rigidly connected to the wall 6 and coaxial therewith, and having an inner annular groove 10 occupied by a sealing washer 11, and an outer annular groove 12 disposed between the flange 7 and a frusto-conical outer bevel 13.

The cover 4 is constituted by a flat substantially circular plate 14 limited internally, that is to say, on the side facing the cup shape body 3, by a concave inwardly facing surface 15. At its periphery, the plate 14 has a stepped conformation, which gives it an outwardly tapered form, and includes a cylindrical surface 16 disposed facing the groove 10 and cooperating sealingly with the seal 11, a first annular step 17 disposed facing an inner cylindrical end surface of the annular body 9 to define with it an annular seat 18, and a second step 19 substantially coplanar with the free end of the annular body 9. Internally of the surface 16, the plate 14 has a step 20 defining a flattened annular projection 21 forced within the flange 8 to rigidly connect the cover 4 to the cup-shaped body 3.

On the periphery of the cover 4 there is mounted, in a position which is angularly adjustable, against the friction of an undulating resilient ring 22 lodged within the seat 18, a ring 23 including a flat annular wall 24 disposed facing the end surface of the annular body 9 and internally of the step 19 in such a way as to cooperate with the ring 22, and a cylindrical wall 25 extending from the periphery of the wall 24 towards the flange 7 and having an internal tooth 26 which can engage the bevel 13 to snap into the interior of the groove 12.

Within the casing 2 there is housed a pressure measuring device generally indicated 27 and including a Bourdon tube (not illustrated) connected to a central shaft 28 which supports an indicator element 29 in the form of a needle movable between the cover 4 and a fixed circular dial 30. The side wall 6 of the cup-shape body 3 has, externally, a tubular projection 31 traversed by an axial hole 32 within which there is mounted a first tubular element 34 which is sealed by means of the interposition of a sealing ring 33; the first tubular element 34 has an internal screw thread 35 and constitutes part of a connector coupling 36 of the manometer 1 for connecting it to the said air bottle (not illustrated). The connector 36 includes a central flange 37 cooperating with the free end of the projection 31 and a second tubular element 38 coaxial with the element 34 and externally provided with a screw thread 39. The element 38 extends from a body 40 of substantially prismatic form, which is axially pierced and which is disposed within the casing 2 in order to support the dial 30 connected thereto by means of a screw 41.

As illustrated in FIG. 1, on the dial 30 there are carried, in positions adjacent one another, two fixed scales 42 and 43 over the first of which the indicator element 29 moves, and which expresses, in a first unit of pressure measurement, the pressure of the residual air within the interior of the air bottle, whilst the second is a scale which the indicator element 29 does not pass over, and which relates to a second unit of measurment, such as an external pressure due to the depth of the dive and is expressed in units of length.

On the outer surface of the flat annular wall 24 of the ring 23 there are formed, in positions adjacent one another, two further scales 44 and 45, which can be displaced with the ring 23 with respect to the fixed scales 42 and 43. Of the two movable scales 44 and 45, the first is a scale similar to the scale 43 and relates to depths expressed in units of length identical to those of the scale 43, but graduated with different dimensions so that, for each angular position of a ring 23 with respect to the fixed casing 2 and within a given angle of rotation, only one value of the scale 43 coincides with an identical value of the scale 44.

Finally, the scale 45 is a scale marked in units of time, which is covered by the indicator element 29.

In use, the diver, having consulted a depth meter with which he is provided so as to know the depth at which he is located, turns the ring 23 to bring the value of the said depth, read on the scale 44, into coincidence with the identical value read on the scale 43. The value in time indicated on the scale 45 by the indicator element 29 corresponds to the time available to the diver to ascend from the depth at which he is located.

From what has been explained above, it is possible to determine that the single operation which the diver must perform to remain always in safe conditions is that of examining, on suitable decompression tables, the time necessary for his ascent on the basis of the maximum depth reached (which can be read on any kind of depth meter provided with a maximum depth indicator) and total immersion time, and to compare this "necessary" time with the "available" time indicated on the scale 45 of the indicator element 29 having adjusted the angular position of the ring 23 in the manner previously described, that is to say on the basis of the depth at which the diver is located.

Obviously, the scale 45 must be graduated in an empirical manner, adopting suitable safety margins, on the basis that the real time available must always be greater than the time indicated on the scale 45.

One possible method for graduating the scale 45 would be to utilise the following formula:

$$X = (bar \times L)/32 - Y(Y+20)/32 \times 10 \quad (1)$$

$$T_x = Y/10 + X \quad (2)$$

where:

$T_x$ = total time "available" for the ascent.

$X$ = time "available" to perform a decompression at a depth of six meters.

bar = pressure in atmospheres indicated on the scale 43

L = total volume of the air bottles

Y = depth at which the diver is located

32 = liters of air consumed per minute at a depth of six meters

20 = liters of air consumer per minute at a depth of 0 meters

10 = speed of ascent expressed in meters per minute.

The above indicated formula means that the ascent times are calculated by subtracting, from the volume of air available, the air necessary for ascent proceeding at a speed of 10 meters per minute, and subdividing the volume of air remaining by the value 32 corresponding to the rate of consumption of air in liters per minute at the depth of six meters.

What is stated above is equivalent to assuming that the decompression stops must all be performed at a depth of six meters and corresponds, therefore, in practice to the introduction of a safety coefficient from the point of view that if it is true that the decompression tables provide for decompression stops to be at a depth greater than six meters it is also true that the decompression stops performed at three meters are of correspondingly greater length.

Figure 3:
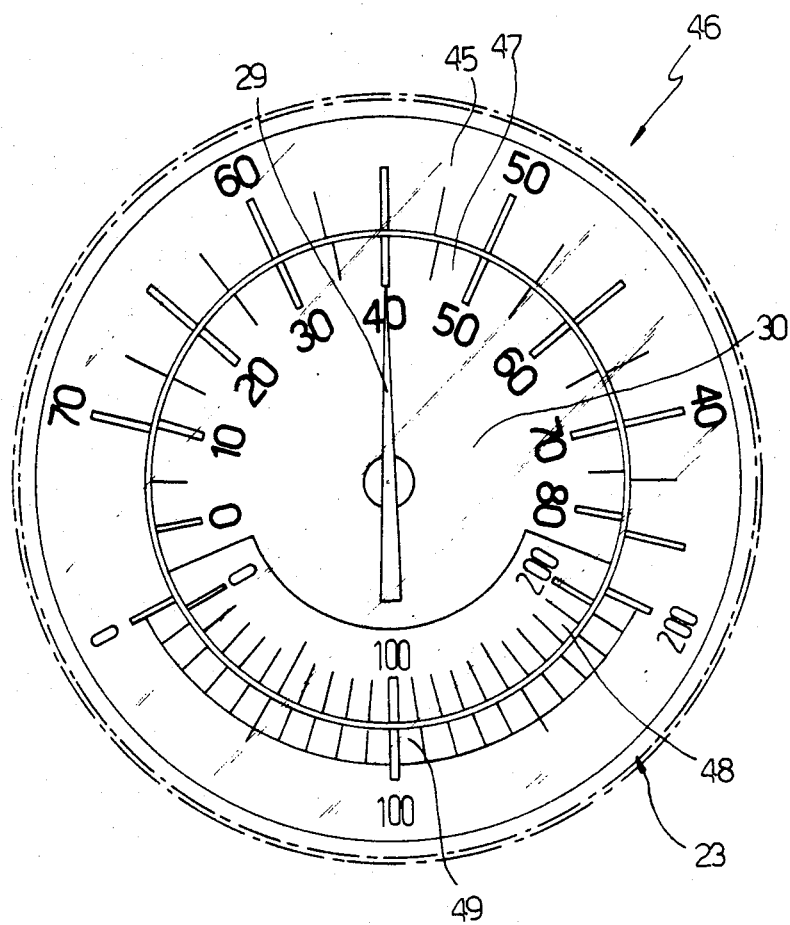
FIG. 3 is a Figure similar to FIG. 1 and illustrates a second embodiment of the manometric instrument according to the present invention.

In FIG. 3 there is illustrated a depth meter generally indicated 46 on which dial 30 is graduated with two fixed scales 47 and 48 the first of which indicates the external ambient pressure converted into meters of depth, and the second of which is a scale relating to the values of the pressure of residual air within the air bottles. The depth meter 46 is also provided with a rotary ring 23 on which are marked the scale 45 and a scale 49 corresponding to the scale 48 and graduated, with respect to this latter, in the same way as the scales 43 and 44 are graduated.

In use, the diver, having consulted a normal manometer connected to his air bottles, displaces the ring 23 in such a way as to bring the value in pressure provided by the said manometer and read on the scale 49 into coincidence with the corresponding value read on the scale 48. Having adjusted the ring 23 in this way the indicator element 29 will indicate on the scale 47 the depth at which the diver is located, and on the scale 45 the total available time for ascent from this depth.

In the case of the depth meter 46 also, the method of calibrating the scale 45 is preferably that described in relation to the manometer 1.

I claim:

1. A manometric instrument for use with air bottles of an underwater respirator for underwater diving, comprising:

a sealed casing having a transparent closure cover;

a first fixed scale disposed at a fixed position within said casing for indicating a first unit of measurement, such as pressure, said first fixed scale having graduations based on the first unit of measurement;

a second fixed scale disposed at a fixed position within said casing adjacent said first fixed scale for indicating pressure, said second fixed scale having graduations based on a second unit of measurement different from said first unit of measurement;

one of said first and second units of measurement expressing units of lengths, and the other of said first and second units of measurement expressing residual pressure of air in said air bottles;

an adjustable support element displacable with respect to said first and second fixed scales;

a first movable scale fixed on said support element and having graduations based on said second unit of measurement and differing from said second fixed scale;

a second movable scale fixed on said support element for indicating an ascent time as a function of the depth underwater and the residual pressure, when said support element is adjustably displaced such that a value on said first movable scale is brought into coincidence with the same value on said second fixed scale;

an indicator element movable along said first fixed scale and said second movable scale; and a transducer device for detecting pressure and for controlling the position of said indicator element in dependence on the detected pressure so as to indicate the ascent time on said second movable scale.

2. An instrument according to claim 1; wherein said indicator element is rotatably mounted about an axis on a support within said casing; and said adjustable support element includes a ring mounted on said casing for rotation with respect thereto about said axis.

3. An instrument according to claim 1; wherein said instrument also functions as a manometer for measuring the pressure of air contained within the air bottles of the underwater respirator when said indicator moves along said first fixed scale.

4. An instrument according to claim 3; wherein said first fixed scale expresses in units of pressure the pressure of the residual air contained within the air bottles of the respirator; and said second fixed scale expresses in units of length the depth at which a diver is located.

5. An instrument according to claim 1; wherein said instrument also functions as a depth meter when said indicator moves along said first fixed scale.

6. An instrument according to claim 5; wherein said first fixed scale expresses the external pressure in units of length and the said second fixed scale expresses pressure of the residual air contained within the interior of said air bottles in units of pressure.

7. An instrument according to claim 1; wherein said second movable scale has graduations corresponding to the total available ascent time, said graduations thereof being determined in relations to graduations on said first and second fixed scales and said first movable scale as follows:

$$T_x = Y/10 + X$$

where:

$X = (\text{bar} \times L)/32 - Y(Y+20)/32 \times 10$ $T_x$ = total available time for the ascent;

$X$ = time available for performing a decompression at a depth of six meters;

bar = pressure in atmospheres of the air in the air bottles;

$L$ = total volume of the air bottles;

$Y$ = depth at which a diver is located;

32 = liters per minute consumed at a depth of six meters;

20 = liters per minute consumed at a depth of 0 meters;

10 = speed of ascent expressed in meters per minute.

* * * * *